United States Patent
Politi et al.

(10) Patent No.: US 6,282,788 B1
(45) Date of Patent: Sep. 4, 2001

(54) VEHICLE WHEEL AND METHOD FOR PRODUCING SAME

(75) Inventors: Dominic Politi, Windsor (CA); Walter Gajor, Livonia, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 0 days.

(21) Appl. No.: 09/605,181

(22) Filed: Jun. 28, 2000

Related U.S. Application Data

(63) Continuation of application No. PCT/US98/27816, filed on Dec. 30, 1998.
(60) Provisional application No. 60/070,046, filed on Dec. 30, 1997.

(51) Int. Cl.$^7$ .............................. B23P 17/00; B60B 3/10
(52) U.S. Cl. ................. 29/894.323; 29/894; 29/894.322; 29/894.325; 301/63.1
(58) Field of Search ................................... 29/894, 894.3, 29/894.32, 894.322, 894.323, 894.325; 301/63.1, 65

(56) References Cited

U.S. PATENT DOCUMENTS

| | | | |
|---|---|---|---|
| 1,741,716 | * 12/1929 | Hunt | 29/894.322 |
| 5,188,429 | 2/1993 | Heck et al. | |
| 5,544,945 | * 8/1996 | Daudi | 301/63.1 |
| 5,694,687 | 12/1997 | Coleman | |
| 5,951,114 | * 9/1999 | Marron et al. | 301/63.1 |

FOREIGN PATENT DOCUMENTS

| | | | |
|---|---|---|---|
| 35 03 882 | * 8/1986 | (DE) | 301/63.12 |
| 754725 | * 8/1956 | (GB) | 301/63.12 |

* cited by examiner

Primary Examiner—P. W. Echols
(74) Attorney, Agent, or Firm—MacMillan, Sobanski & Todd, LLC

(57) ABSTRACT

An improved vehicle wheel and method for producing the same includes a wheel rim and a wheel disc joined together by a weld. The wheel disc includes a generally centrally located wheel mounting portion which defines a vertical axis and an outer annular flange. The outer annular flange of the wheel disc defines an outer surface which is inverted at a predetermined angle relative to the vertical axis. The outer annular flange further includes a plurality of arches formed therein. The method for forming the vehicle wheel of the present invention includes the steps of (a) providing a wheel rim; (b) providing a generally circular disc blank; (c) initially stamping the disc blank to produce a generally bowl shaped wheel disc having an inner wheel mounting portion and an outer annular portion; (d) subjecting the bowl shaped wheel disc to an intermediate metal forming operation to produce a partially formed wheel disc defining a wheel disc vertical axis, the partially formed wheel disc having an outer annular flange which extends generally in the same direction as the wheel disc vertical axis, the outer annular flange having a plurality of arches formed therein; (e) subjecting the partially formed wheel disc to a series of metal forming operations to produce a partially formed wheel disc having a center hub hole, and a plurality of lug bolt receiving holes spaced circumferentially around the hub hole; (f) subjecting the partially formed wheel disc to a metal forming operation wherein the outer annular flange of the partially formed wheel disc is inverted radially inwardly relative to the vertical disc axis to thereby form a finished wheel disc; (g) positioning the outer annular flange of the wheel disc adjacent an inner surface of the wheel rim; and (h) welding the wheel disc to the wheel rim to produce the vehicle wheel.

14 Claims, 6 Drawing Sheets

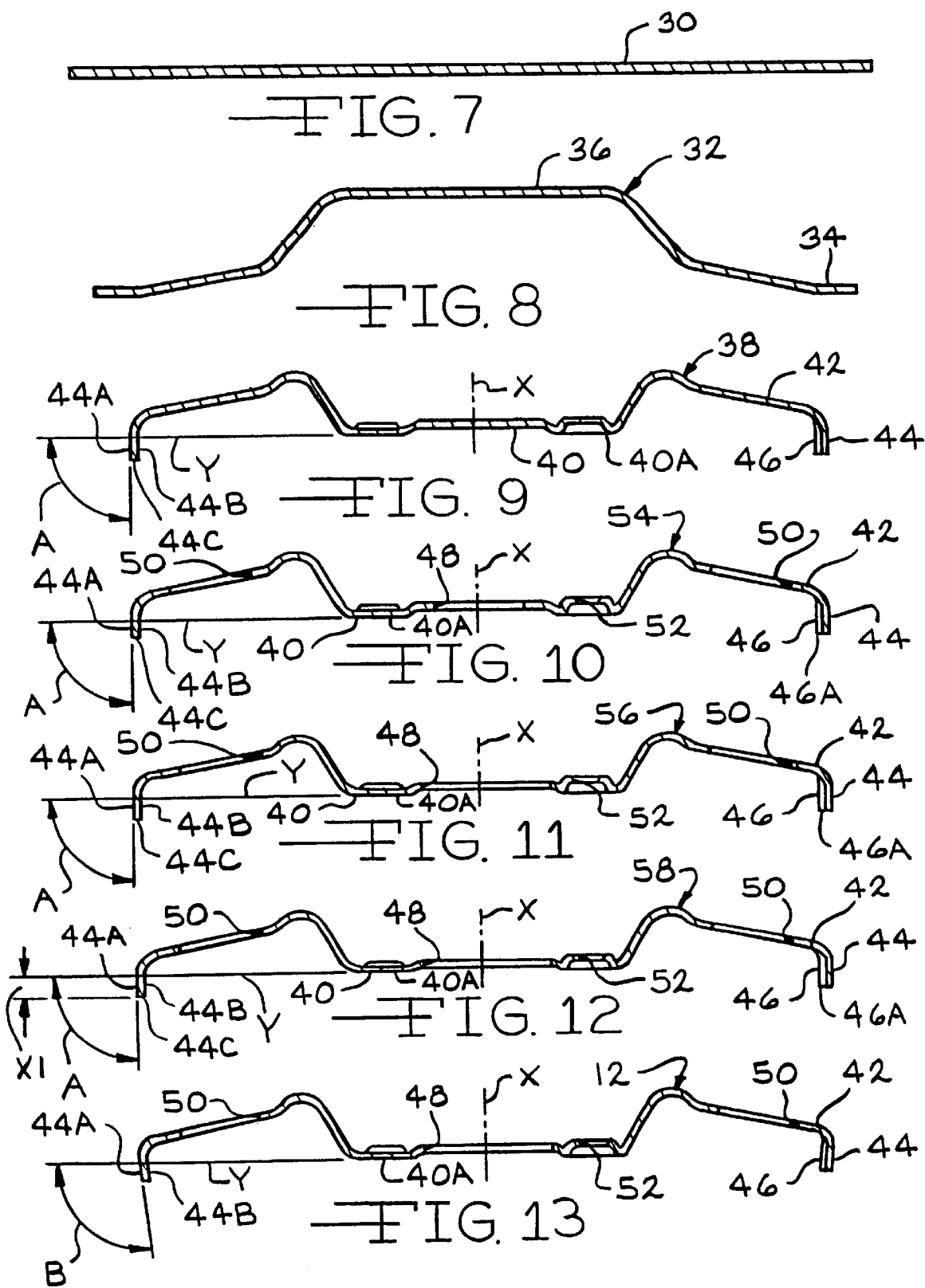

VEHICLE WHEEL AND METHOD FOR PRODUCING SAME

CROSS-REFERENCE TO RELATED APPLICATIONS

This application claims the benefit of U.S. Provisional Application Serial No. 60/070,046, filed Dec. 30, 1997, and International Application No. PCT/98/27816, filed Dec. 30, 1998.

BACKGROUND OF THE INVENTION

This invention relates in general to vehicle wheels and in particular to an improved vehicle wheel, especially a bead seat attached vehicle wheel, and method for producing the same.

A conventional bead seat attached vehicle wheel is of a two-piece construction and includes an inner wheel disc and an outer "full" wheel rim. The wheel disc can be cast, forged, or fabricated from steel, aluminum, or other alloys, and includes an inner annular wheel mounting portion and an outer annular portion. The wheel mounting portion defines an inboard mounting surface and includes a center pilot or hub hole, and a plurality of lug receiving holes formed therethrough for mounting the wheel to an axle of the vehicle. The wheel rim is fabricated from steel, aluminum, or other alloys, and includes an inboard tire bead seat retaining flange, an inboard tire bead seat, an axially extending well, an outboard tire bead seat, and an outboard tire bead seat retaining flange. In some instances, a three-piece wheel construction having a mounting cup secured to the wheel disc is used. In both types of constructions, the outer annular portion of the wheel disc is provided with an "angle" at the outer peripheral end of the wheel disc for securing the wheel disc to the wheel rim by welding. Typically, in a steel wheel disc, the angle is formed by machining off the material of the wheel disc. In an aluminum wheel disc, the angle is typically formed by a spinning operation.

SUMMARY OF THE INVENTION

This invention relates to an improved vehicle wheel and method for producing the same. The vehicle wheel of the present invention includes a wheel rim and a wheel disc joined together by a weld. The wheel rim includes an inboard tire bead seat retaining flange, an inboard tire bead seat, a generally axially extending well, an outboard tire bead seat, and an outboard tire bead seat retaining flange. The wheel disc defines a horizontal axis and includes a generally centrally located wheel mounting portion and an outer annular flange. The wheel mounting portion defines a vertical axis and includes a pilot aperture and a plurality of lug bolt receiving holes spaced circumferentially around the pilot aperture. The outer annular flange of the wheel disc defines an outer surface and an inner surface which is substantially parallel with the outer surface so as to define a generally constant thickness throughout the entire length thereof. The outer surface of the outer annular flange is inverted at a predetermined angle relative to the vertical axis. The outer annular flange further includes a plurality of arches formed therein. The method for forming the vehicle wheel of the present invention includes the steps of (a) providing a wheel rim defining a rim axis and including an inboard tire bead seat retaining flange, an inboard tire bead seat, a well portion, an outboard tire bead seat, and an outboard tire bead seat retaining flange; (b) providing a generally circular disc blank; (c) initially stamping the disc blank to produce a generally bowl shaped wheel disc having an inner wheel mounting portion and an outer annular portion; (d) subjecting the bowl shaped wheel disc to an intermediate metal forming operation to produce a partially formed wheel disc defining a wheel disc horizontal axis and a wheel disc vertical axis, the partially formed wheel disc having an outer annular flange which extends generally in the same direction as the wheel disc vertical axis, the outer annular flange having a plurality of arches formed therein; (e) subjecting the partially formed wheel disc to a series of metal forming operations to produce a partially formed wheel disc having a center hub hole, and a plurality of lug bolt receiving holes spaced circumferentially around the hub hole; (f) subjecting the partially formed wheel disc to a metal forming operation wherein the outer annular flange of the partially formed wheel disc is inverted radially inwardly relative to the vertical disc axis to thereby form a finished wheel disc; (g) positioning the outer annular flange of the wheel disc adjacent an inner surface of the wheel rim; and (h) welding the wheel disc to the wheel rim to produce the vehicle wheel.

Other advantages of this invention will become apparent to those skilled in the art from the following detailed description of the preferred embodiment, when read in light of the accompanying drawings.

BRIEF DESCRIPTION OF THE DRAWINGS

FIG. 7 is a cross sectional view of a disc blank for use in producing the wheel disc in accordance with this invention.

FIG. 8 is a cross sectional view showing the initial forming of the wheel disc blank into a generally bowl shaped disc in accordance with this invention.

FIG. 9 is a cross sectional view showing the forming of the disc into a partially formed disc including forming an inverse outer flange, a center hub hole, and a plurality of lug bolt receiving holes in the partially formed disc in accordance with this invention.

FIG. 10 is a cross sectional view showing the forming of the windows in the partially formed disc in accordance with this invention.

FIG. 11 is a cross sectional view showing the restriking of the hub hole in the partially formed disc in accordance with this invention.

FIG. 12 is a cross sectional view showing the trimming of the outer flange of the partially formed disc in accordance with this invention.

FIG. 13 is a cross sectional view showing inverting or bending of the outer flange of the partially formed disc to produce a finished disc in accordance with this invention.

DESCRIPTION OF THE PREFERRED EMBODIMENT

Figure 3:
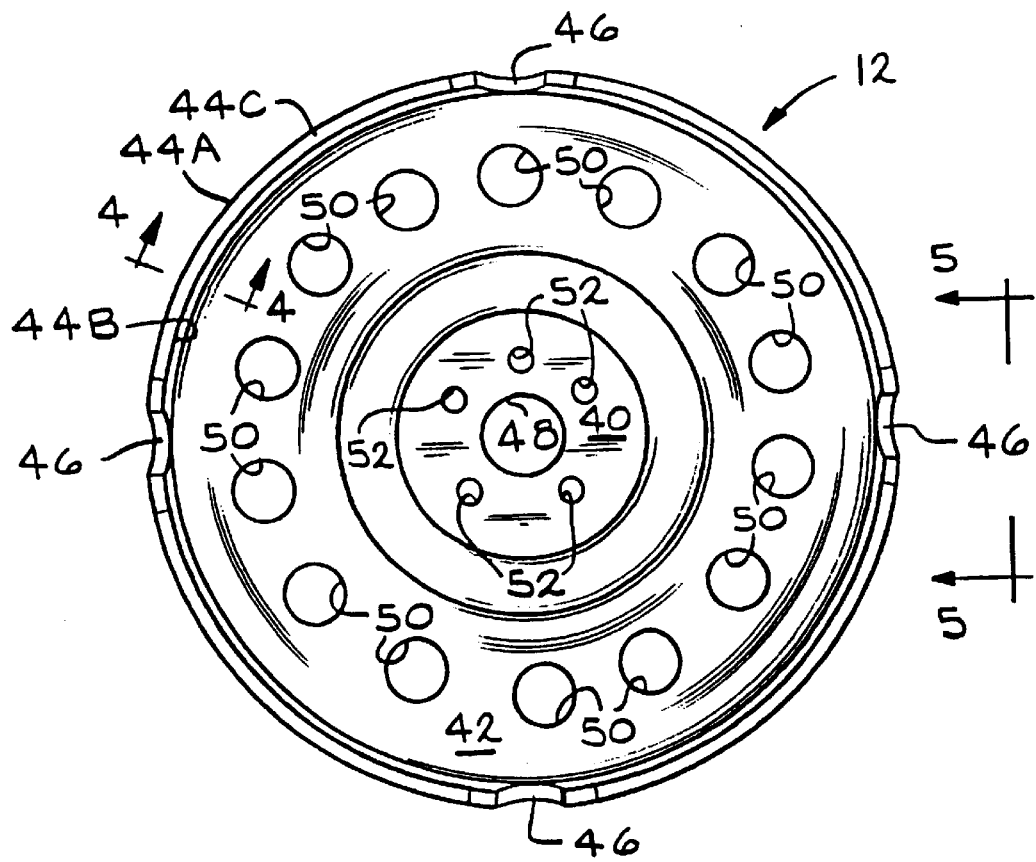
FIG. 3 is another pictorial view of the wheel disc illustrated in FIG. 1.
Figure 4:
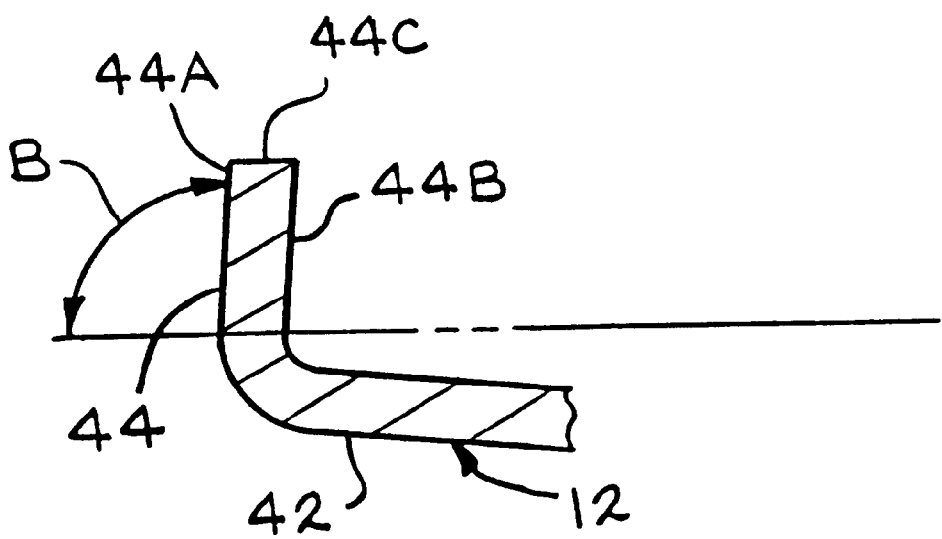
FIG. 4 is sectional view of a portion of the wheel disc illustrated in FIG. 3.
Figure 5:
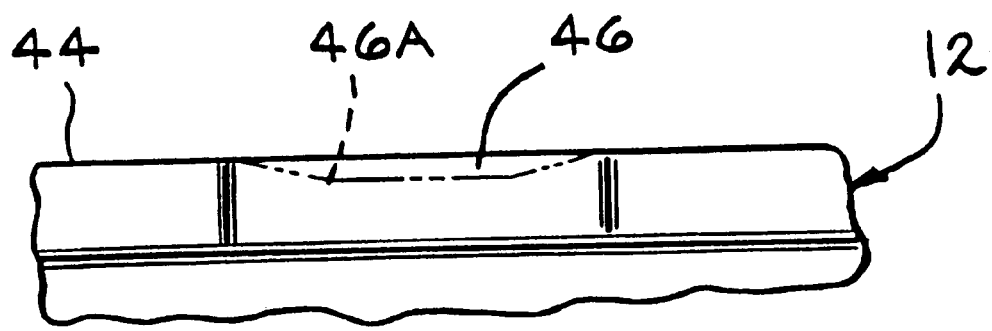
FIG. 5 is an elevational view of a portion of the wheel disc illustrated in FIG. 3.
Figure 6:
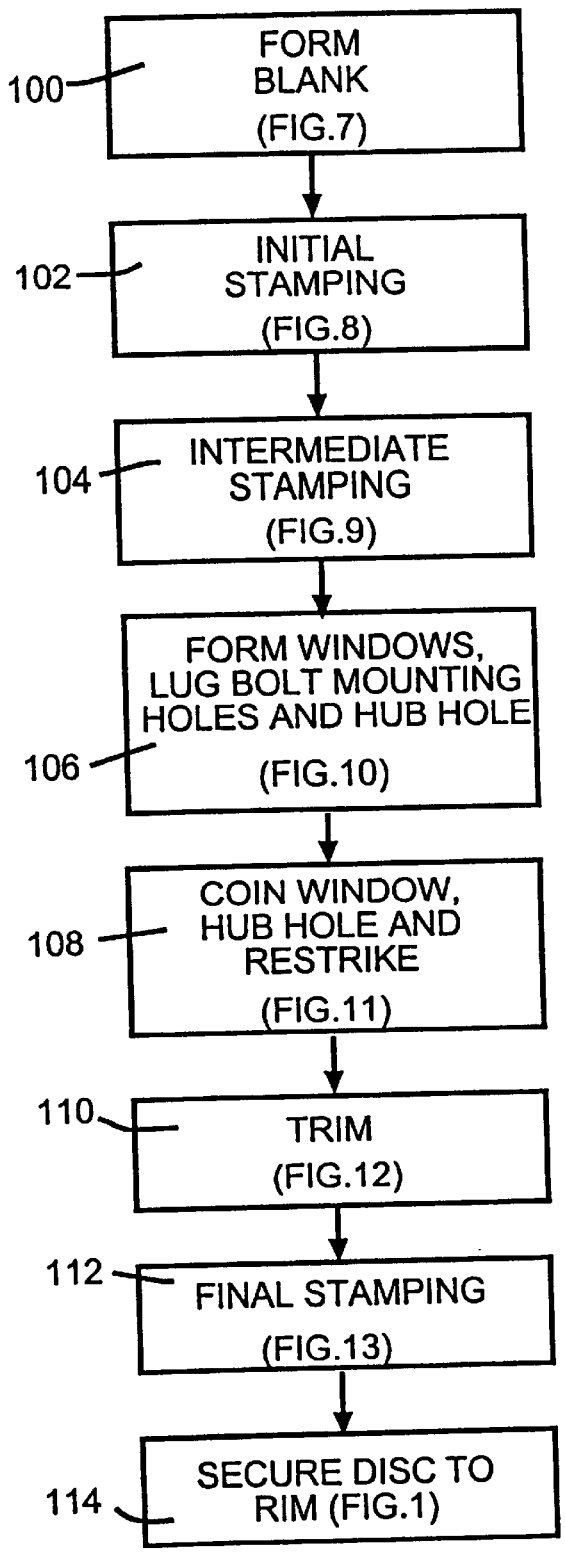
FIG. 6 is a block diagram illustrating a sequence of steps for producing the wheel disc in accordance with this invention.

Referring now to the drawings, there is illustrated in FIG. 6 a block diagram showing a sequence of steps for producing a vehicle wheel in accordance with the present invention. The vehicle wheel produced according to this sequence of steps is illustrated as being a bead seat attached fabricated steel vehicle wheel, indicated generally at 10 in FIG. 1. However, it will be appreciated that the present invention can be used in conjunction with other types of fabricated vehicle wheels having a wheel disc produced in accordance with this invention. For example, the vehicle wheel can be a "bead seat attached" wheel (such as shown in FIG. 4 of U.S. Pat. No. 5,188,429 to Heck et al. and FIG. 30 of U.S. Pat. No. 5,694,687 to Coleman), and a "well attached" wheel (such as shown in FIG. 3 of Heck et al.), all of these patents incorporated herein by reference. Also, the vehicle wheel 10 of this invention can be formed from other materials, such as for example, aluminum and alloys thereof, or other combinations of materials, such as for example, aluminum and alloys thereof and steel.

Turning to FIG. 6, the sequence of steps for producing the vehicle wheel 10 of the present invention will be discussed. Initially, in step 100, a flat sheet of suitable material (not shown) is formed into a wheel disc blank 30, shown in FIG. 7. The wheel disc blank 30 defines a generally uniform disc thickness. Following this, the wheel disc blank 30 is stamped in initial stamping step 102 to produce a generally bowl-shaped wheel disc 32, shown in FIG. 8. The bowl-shaped wheel disc 32 includes an outer annular portion 34 and an inner annular portion 36.

The bowl-shaped wheel disc 32 is then stamped into a partially-formed wheel disc 38 having a predetermined profile, shown in FIG. 9, during intermediate stamping step 104. The partially-formed wheel disc 38 includes a generally centrally located wheel mounting portion 40 and an outer annular portion 42 having a predetermined profile. The partially-formed wheel disc 38 defines a longitudinal or horizontal axis X, and the wheel mounting portion 40 includes an inner surface 40A which defines a vertical axis Y.

The outer annular portion 42 of the wheel disc 38 defines a wheel disc outer annular leg or flange 44 having an outer side surface 44A, an inner side surface 44B, and an end surface 44C. In the illustrated embodiment, the outer side surface 44A is substantially parallel with the inner side surface 44B so as to define a generally constant thickness throughout the entire length of the outer annular flange 44. The outer side surface 44A of the outer annular flange 44 of the wheel disc 38 is oriented at a predetermined angle A relative to the vertical axis Y. Preferably, the angle A is in the range from about 89 degrees to about 91 degrees, with a preferred angle A of about 90 degrees.

Figure 2:
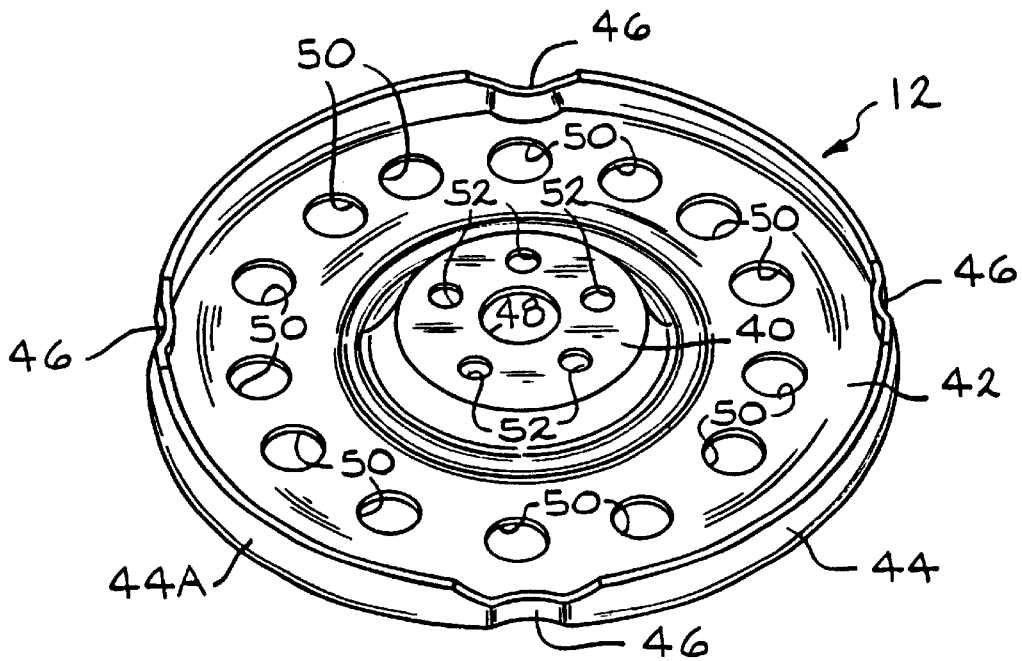
FIG. 2 is a pictorial view of the wheel disc illustrated in FIG. 1.

Also, during intermediate stamping step 104, a plurality of spaced apart generally inwardly curved or concave portions or arches 46 (four arches 46 being illustrated in FIGS. 2 and 3) are formed in the outer annular flange 44 of the partially-formed wheel disc 38. In the illustrated embodiment, the arches 46 are formed equidistantly around the circumference of the outer annular flange 44 of the wheel disc 38. As best shown in FIGS. 2 and 3, each arch 46 extends radially inwardly relative to a circle defined by the outer side surface 44A of the outer annular portion 44.

Next, in step 106, a center hub hole 48, a plurality of windows 50 (two of such windows 50 is illustrated in FIG. 10 and fourteen of such windows 50 are illustrated in FIGS. 2 and 3), and a plurality of lug bolt mounting holes 52 (one of such lug bolt mounting holes 52 is illustrated in FIG. 10, and eighteen of such lug bolt mounting holes are illustrated in FIGS. 2 and 3), are formed in the wheel disc 38 to produce a partially formed wheel disc 54 shown in FIG. 10. Following this, in step 108, the windows 50 and the center hub hole 48 are coined and the partially formed wheel disc 54 is restriked to produce a partially formed wheel disc 56 shown in FIG. 11.

Next, in step 110, the outer annular flange 44 of the wheel disc 56 is trimmed to predetermined tolerances to produce a partially formed wheel disc 58 shown in FIG. 12. In particular, the end surface 44C of the outer annular flange 44 is trimmed to define a predetermined axial dimension X1 between the inner surface 40A of the wheel mounting portion 40 and the end surface 44C of the outer annular flange 44. Depending upon the particular wheel disc construction, during step 110 a slight trimming of an outer end surface 46A of the arches 46 may occur.

Figure 14:
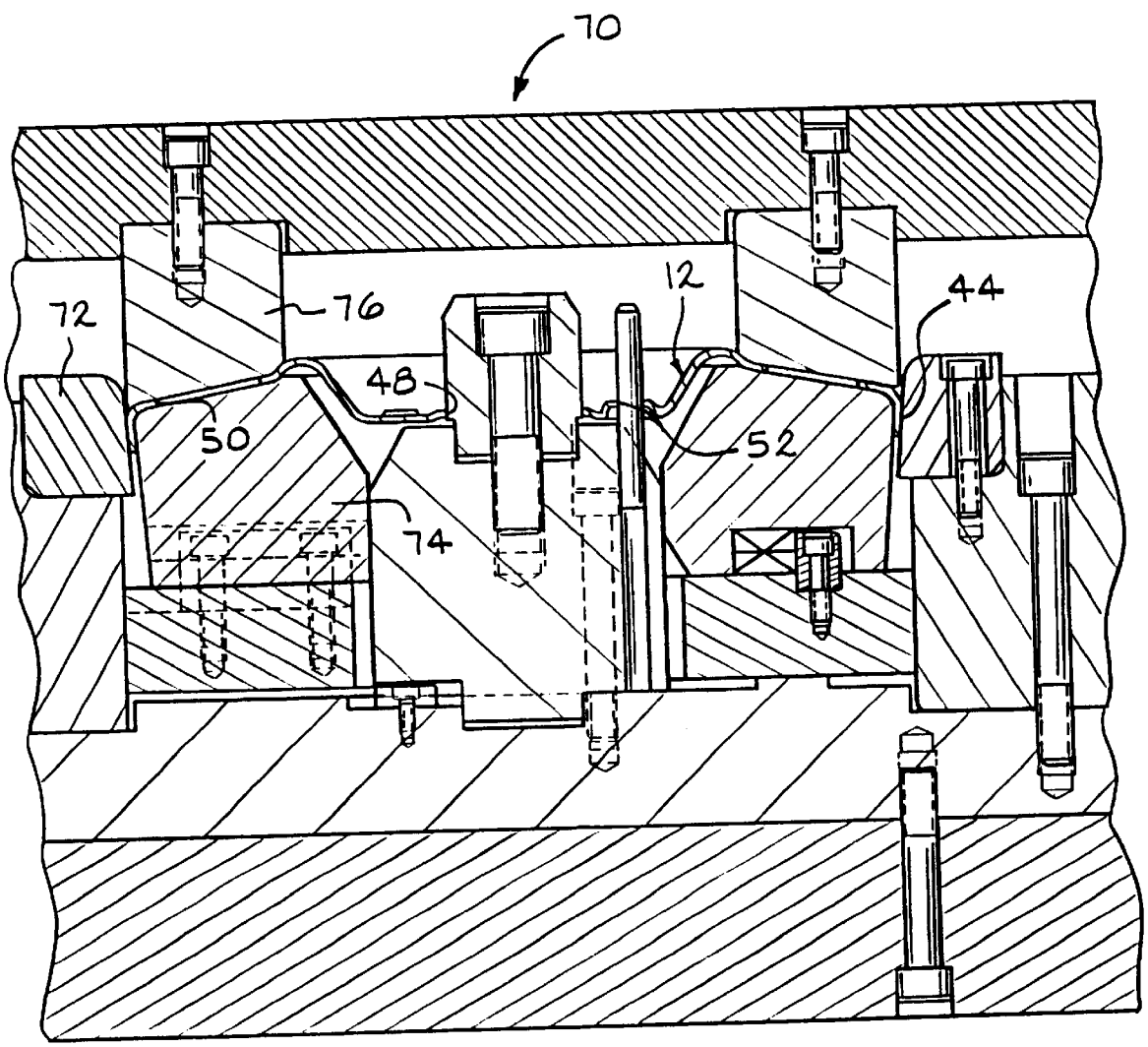
FIG. 14 is a sectional view showing a die fixture used to form the inverse angle in the outer flange of the wheel disc in accordance with this invention.

Following this, in step 112, the partially formed wheel disc 58 is subjected to a final stamping operation to produce a fully formed or finished wheel disc 12. To accomplish this, the partially formed wheel disc 58 is positioned in a die fixture, indicated generally at 70 in FIG. 14. The illustrated die fixture 70 includes a plurality of dies which are effective to engage the outer annular flange 44 of the wheel disc 58 (three such dies 72, 74, and 76 being illustrated in die fixture 70 shown in FIG. 14), causing the outer annular flange 44 to be bent or inverted radially inwardly toward the longitudinal axis X of the wheel disc 58. In particular, the outer annular flange 44 of the finished wheel disc 12 is inverted radially inwardly so as to orient the outer side surface 44A thereof at a predetermined angle B relative to the vertical Y of the wheel mounting surface 40 of the disc 12. Preferably, the angle B is in the range from about 91° to about 99° relative to the vertical axis Y. More preferably, the angle B is approximately 95° relative to the vertical axis Y.

Figure 1:
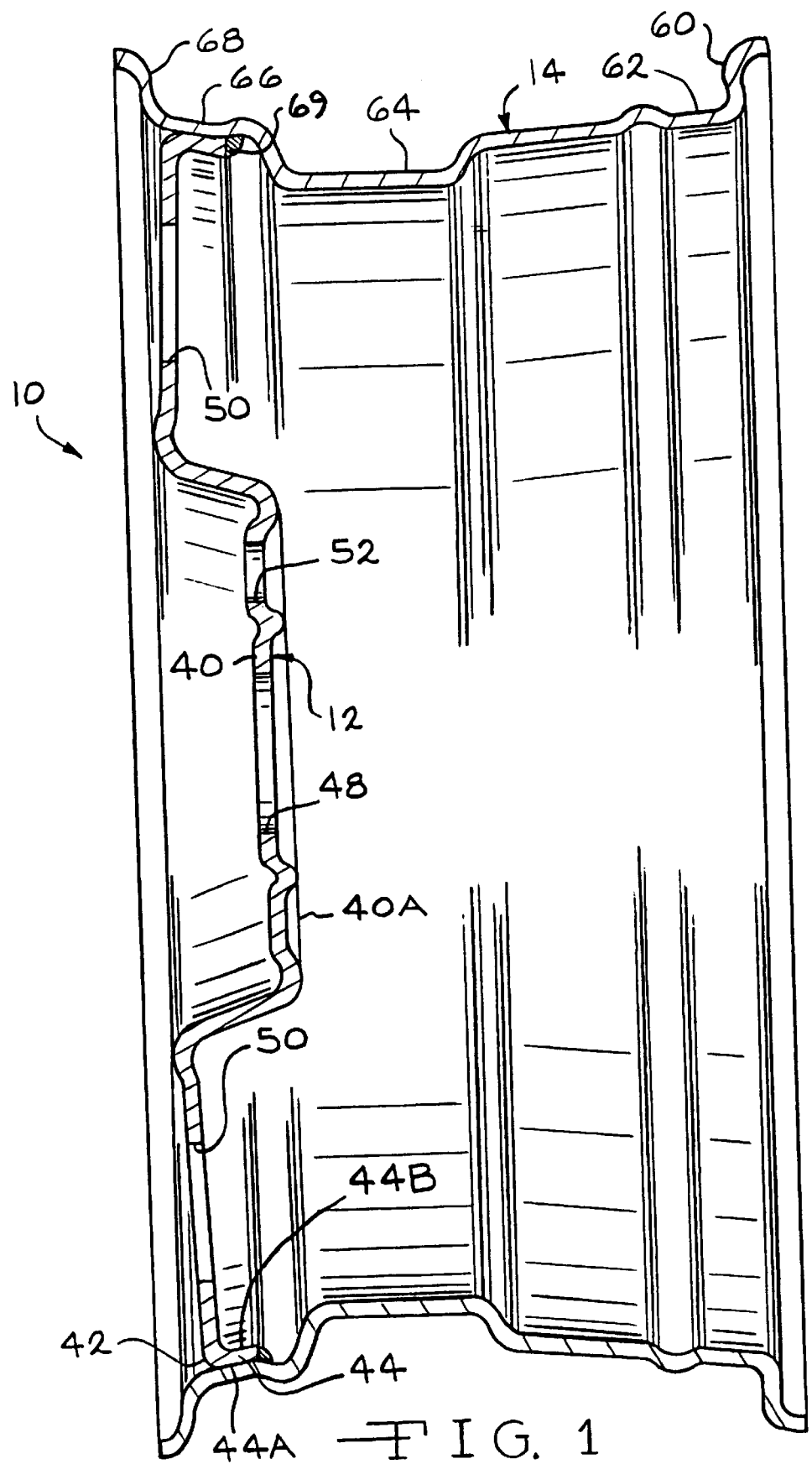
FIG. 1 is a sectional view of a vehicle wheel produced in accordance with this invention.

In step 114, the finished wheel disc 12 is secured to the wheel rim 14 to thereby produce the vehicle wheel, shown in FIG. 1. As shown therein, the wheel rim 12 includes an inboard tire bead seat retaining flange 60, an inboard tire bead seat 62, a generally axially extending well 64, an outboard tire bead seat 66, and an outboard tire bead seat retaining flange 68. In particular, during step 114, the outer surface 44A of the outer annular flange 44 of the wheel disc 12 is positioned adjacent an inner surface 66A of the outboard tire bead seat 66 of the wheel rim 14 and a weld 69 is applied to secure the wheel rim 12 and the wheel disc 14 together to produce the finished bead seat attached fabricated vehicle wheel 10 of this invention.

While the present invention has been disclosed and described with the particular vehicle wheel 10 disclosed herein, it will be appreciated that this invention can be used in conjunction with other types of vehicle wheels. Also, the wheel disc 12 of this invention can be formed from other materials, such as for example, aluminum and alloys thereof, titanium, and magnesium. In addition, while the present invention has been disclosed and described as forming the arches 46 in the outer annular flange 44 of the wheel disc during step 104 (shown in FIG. 9), it will be appreciated that the arches 46 can be formed other than disclosed herein. For example, the arches 46 can be formed having a different profile than that disclosed herein; the arches 46 can be formed by other suitable methods than that disclosed herein; and/or the arches 46 can be formed in the "partially formed disc" at other steps of the wheel disc forming process than that disclosed herein. However, regardless of the shape and the method used, the arches 46 need to be formed in the "partially formed disc" prior to the "inverting" or bending process of the outer annular flange 44 of the wheel disc (shown in final stamping step 112), so that during the forming of the inverse angle in the outer annular flange 44, the arches 46 are effective to allow the material of the outer annular flange 44 to be inverted or bent to a desired angle B without causing "buckling" of the material thereof during such forming process.

One advantage of this invention is that outer annular flange 44 of the wheel disc can be inverted during a stamping operation using a unique die fixture 70. In the prior art, a steel disc typically is machined to provide the inverse angle in the outer annular flange of the wheel disc, and an aluminum disc typically is spun formed to provide the inverse angle in the outer annular flange of the wheel disc. As a result, the manufacturing costs associated with the wheel disc 12 of this invention having an inverted outer annular flange formed by a stamping operation are substantially less than those to produce a similar sized prior art steel wheel disc wherein the outer annular flange is machined to form the inverse angle therein, and less than those to produce a similar sized prior art aluminum wheel disc wherein the outer annular flange is spun formed to form the inverse flange.

In accordance with the provisions of the patents statues, the principle and mode of operation of this invention have been described and illustrated in its preferred embodiment. However, it must be understood that the invention may be practiced otherwise than as specifically explained and illustrated without departing from the scope or spirit of the attached claims.

What is claimed is:

1. A method for forming a vehicle wheel comprising the steps of:
   (a) providing a preformed wheel rim defining a rim axis and including an inboard tire bead seat retaining flange, an inboard tire bead seat, a well portion, an outboard tire bead seat, and an outboard tire bead seat retaining flange;
   (b) providing a generally circular disc blank;
   (c) initially stamping the disc blank to produce a generally bowl shaped wheel disc having an inner wheel mounting portion and an outer annular portion;
   (d) subjecting the bowl shaped wheel disc to an intermediate metal forming operation to produce a partially formed wheel disc defining a wheel disc horizontal axis and a wheel disc vertical axis, the partially formed wheel disc having an outer annular flange which is oriented at a first predetermined angle relative to the wheel disc vertical axis;
   (e) forming a plurality of arches in the outer annular flange of the partially formed wheel disc;
   (f) subjecting the partially formed wheel disc to a series of metal forming operations to produce a partially formed wheel disc having a center hub hole, and a plurality of lug bolt receiving holes spaced circumferentially around the hub hole;
   (g) subjecting the partially formed wheel disc to a metal forming operation wherein the outer annular flange of the partially formed wheel disc is formed radially inwardly to a second predetermined angle relative to the wheel disc vertical axis to thereby form a finished wheel disc;
   (h) positioning the outer annular flange of the finished wheel disc adjacent an inner surface of the preformed wheel rim; and
   (i) welding the finished wheel disc to the preformed wheel rim to produce the vehicle wheel.

2. The method according to claim 1 wherein in step (d) the outer annular flange is oriented at a first predetermined angle which is in the range from about 89 degrees to about 91 degrees relative to the wheel disc vertical axis.

3. The according to claim 1 wherein in step (g) the outer annular flange is formed radially inwardly at a second predetermined angle which is in the range from about 91 degrees to about 99 degrees relative to the wheel disc vertical axis, as measured from the outside of the annular flange.

4. The method according to claim 1 wherein in step (d) the outer annular flange is oriented at a first predetermined angle which is in the range from about 89 degrees to about 91 degrees relative to the wheel disc vertical axis, and in step (g) the outer annular flange is formed radially inwardly oriented at a second predetermined angle which is in the range from about 92 degrees to about 99 degrees relative to the wheel disc vertical axis, as measured from the outside of the annular flange.

5. The method according to claim 1 wherein the arches in step (e) are formed equidistantly around the circumference of the outer annular flange of the partially formed wheel disc, each of the arches extending radially inwardly relative to a circle defined by the outer annular flange.

6. The method according to claim 1 wherein step (g) includes positioning the partially formed wheel disc in a die fixture having a plurality of dies and engaging the outer annular flange with the dies causing the outer annular flange to be formed radially inwardly to the second predetermined angle.

7. A method for forming a vehicle wheel comprising the steps of:
   (a) providing a wheel rim;
   (b) providing a wheel disc having a centrally located wheel mounting surface and an outer annular flange, the outer annular flange having a plurality of arches formed therein, the outer annular flange being formed radially inwardly at a predetermined angle relative to wheel mounting surface of the wheel disc; and
   (c) joining the wheel disc to the wheel rim to produce the vehicle wheel.

8. The method according to claim 7 wherein the annular flange in step (b) is formed radially inwardly at a predetermined angle which is in the range from about 91 degrees to about 99 degrees relative to the wheel mounting surface, as measured from the outside of the annular flange.

9. The method according to claim 7 wherein the arches in step (b) are formed equidistantly around the circumference of the outer annular flange of the partially formed wheel disc, each of the arches extending radially inwardly relative to a circle defined by the outer annular flange.

10. The method according to claim 7 wherein the wheel rim defines a rim axis and includes an inboard tire bead seat retaining flange, an inboard tire bead seat, a well portion, an outboard tire bead seat, and an outboard tire bead seat retaining flange.

11. The method according to claim 7 wherein the wheel disc includes a center hub hole and a plurality of lug bolt receiving holes spaced circumferentially around the hub hole.

12. A wheel disc adapted for use in a vehicle wheel comprising:
   a wheel disc defining a horizontal axis and including a generally centrally located wheel mounting portion and an outer annular flange, said wheel mounting portion defining a vertical axis, said outer annular flange having a plurality of arches formed therein, said outer annular flange being formed radially inwardly at a predetermined angle relative to said wheel disc vertical axis said arches are formed around the circumference of said outer flange of said wheel disc, and said arche extend radially inwardly relative to a circle defined by said outer annular flange.

13. The wheel disc defined in claim 12 and further including a center hub hole and a plurality of lug bolt receiving holes spaced circumferentially around said pilot aperture formed therein.

14. The wheel disc defined in claim 12 wherein said arches are formed equidistantly around the circumference of said outer annular flange of said wheel disc.

* * * * *